US007877507B2

(12) United States Patent
Schneider (10) Patent No.: US 7,877,507 B2
(45) Date of Patent: Jan. 25, 2011

(54) TUNNELING SSL OVER SSH (75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 223 days.

(21) Appl. No.: 12/072,932

(22) Filed: Feb. 29, 2008

(65) Prior Publication Data
US 2009/0222578 A1 Sep. 3, 2009

(51) Int. Cl.
*G06F 15/173* (2006.01)
(52) U.S. Cl. .................................................... 709/238
(58) Field of Classification Search .................. 709/238
See application file for complete search history.

(56) References Cited

U.S. PATENT DOCUMENTS

| | | | | |
|---|---|---|---|---|
| 5,944,823 | A * | 8/1999 | Jade et al. ...................... 726/15 |
| 6,122,256 | A * | 9/2000 | Berglund ...................... 370/241 |
| 6,859,835 | B1 * | 2/2005 | Hipp ............................ 709/227 |
| 6,938,096 | B1 * | 8/2005 | Greschler et al. ............ 709/239 |
| 7,076,518 | B1 * | 7/2006 | Twede .......................... 709/201 |
| 7,346,925 | B2 * | 3/2008 | Marcjan ....................... 726/12 |
| 7,408,906 | B2 * | 8/2008 | Griswold et al. ............. 370/338 |
| 7,573,829 | B2 * | 8/2009 | Blair et al. ................... 370/250 |
| 7,673,048 | B1 * | 3/2010 | O'Toole et al. .............. 709/226 |
| 2002/0065908 | A1 * | 5/2002 | Agerholm et al. ............ 709/223 |
| 2002/0099851 | A1 * | 7/2002 | Shah et al. ................... 709/246 |
| 2003/0131263 | A1 * | 7/2003 | Keane et al. ................. 713/201 |
| 2004/0019806 | A1 * | 1/2004 | Beyh ............................ 713/201 |
| 2005/0106941 | A1 * | 5/2005 | Witchey ....................... 439/620 |
| 2007/0058555 | A1 * | 3/2007 | Blair et al. ................... 370/250 |
| 2007/0283028 | A1 * | 12/2007 | Gilroy et al. ................. 709/230 |
| 2009/0172185 | A1 * | 7/2009 | Chandra et al. .............. 709/236 |

OTHER PUBLICATIONS

Phillip's Ponderings, Oct. 7, 2007.*
CryptoHeaven, SSL Protocol, Dec. 5, 2002.*
Christias, Panagiotis, http://unixhelp.ed.ac.uk/CGI/man-cgi?ssh+1, "BSD General Commands Manual," UNIX man pages : ssh (1), (1994), printed Jan. 11, 2008, 13 pgs.
http://www.ece.uvic.ca/computing/port_forwarding.shtml, "An Introduction to the Black Art of Port Forwarding with SSH," University of Victoria, British Columbia, Canada, Electrical & Computer Engineering, printed Jan. 11, 2008, 7 pgs.

* cited by examiner

*Primary Examiner*—Thu Nguyen
*Assistant Examiner*—Brian P Whipple
(74) *Attorney, Agent, or Firm*—Blakely, Sokoloff, Taylor & Zafman LLP (57) ABSTRACT

A system and method for enabling single-socket server applications to receive information via multiple ports. In one embodiment, a system includes a network tunnel configured to receive traffic at a first port of an application server and to communicate the received traffic to a second port of the application server. The system further includes a single-socket application, coupled to the second port of the application server, to monitor for incoming traffic at the second port, and to receive the traffic destined for the first port and communicated to the second port via the network tunnel.

19 Claims, 4 Drawing Sheets

FIG. 4

TUNNELING SSL OVER SSH

TECHNICAL FIELD

Embodiments of the invention relate to the field of network port management, and more particularly, to a system and method for enabling single socket server applications to receive information via multiple ports.

BACKGROUND

Many server applications and various types of software applications in general are capable of sending and receiving information from other network connected applications. A well known type of server application is a "web server" which is available to many "web clients" and operates to serve web pages to those web clients upon request. For example, a user working at a client machine can launch a web browser, such as Firefox™ and navigate to a website via the web browser. When the user instructs the web browser to navigate to a web site, the web browser makes an HTTP (Hyper Text Transfer Protocol) request to a web server operating on a remote server. Web server software, such as Apache™, accepts the HTTP request, and returns a web page to the web browser client, which is displayed for the user and appears as one page of a web site.

Most network connected software applications receive incoming requests via predetermined "ports," which associate a particular type of incoming data or request with an intended software application to service requests or process the data in some manner. For example, web servers customarily receive HTTP requests at port 80, HTTPS (HTTP over Secure socket layer) requests are customarily received at port 443, and the now defunct "finger protocol" application traditionally operated at port 79.

Some server applications are capable of operating on and receiving information from multiple ports through the use of multiple "sockets" internal to the server application. A socket is the combination of a known Internet Protocol ("IP") address and a specific port number. Other server applications, such as "finger" or rudimentary implementations of FTP (File Transfer Protocol) are incapable of receiving information from multiple ports because they lack the necessary logic to support multiple sockets which enable the server application to receive information at the multiple ports.

Supporting multiple ports through multiple sockets makes an application inherently more complex, although the use of standardized libraries can simplify the necessary logic. Application developers must balance the complexity inherent in supporting multiple ports with the underlying functional goals of the application. A single socket application is faster and simpler to develop, though less feature-rich, while a multi-socketed multi-port application yields a greater feature set, but is more costly and complex to develop. Furthermore, single-socket applications will generally consume fewer system resources than multi-socket applications due in part to the simplified application's logic.

The problems with single-socket applications become exacerbated when those applications are being used by a large number of clients, such as a publicly available network service. Each client must be configured to connect with the appropriate port, e.g. port 10,000, supported by the application. If that port should change for whatever reason, e.g. from port 10,000 to port 443, all clients configured to connect to the old port (10,000) would receive an error, as their communication attempt would fail as it is no longer associated with the server application. A system administrator responsible for the service could send users instructions on reconfiguration, but as the number of users increases, the potential for support problems and upset users increases dramatically due to reconfiguration errors, users not receiving the notices, or users failing to understand the timing of the charge, and so forth.

Alternatively, the single-socket application could be modified, but doing so presents a significant cost and enormous technical complexity depending on the application, especially for older "legacy" type services that may no longer have active development support teams, but are still in use by an enterprise. More sophisticated multi-socket applications do not present such a problem, as the multi-socket application may simply be reconfigured to monitor an additional port without ceasing to provide services at a previously used port. This reconfiguration could accommodate clients of a new port without adversely affecting clients attempting to connect with an old port.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein are a system and method for enabling single-socket server applications to receive information via multiple ports. A single-socket application as referred to herein is an application that is capable of listening for and receiving traffic at a single network port natively. In one embodiment, a single-socket application configured to receive information at a first network port is enabled to receive information from a second network port via a network tunnel. The network tunnel is configured to receive information directed at the second network port and communicate the information to the first network port where it may be received by the single-socket application. Practice of the disclosed systems and methods enable a single-socket application to receive and process information directed at multiple network ports without modification to the single-socket application.

In the following description, numerous specific details are set forth such as examples of specific systems, languages, components, etc., in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Embodiments of a mechanism for enabling a single-socket application to receive information via multiple ports will now be discussed in more detail. An exemplary single-socket application may be a lightweight utility application that allows users to connect from a web interface (e.g., a web browser) running on a remote client and administer various settings, parameters, and functionality of a more complex application(s).

The lightweight utility application has native capabilities allowing it to listen for and receive network traffic at only one network port. This single-socket application was intentionally kept lightweight during its initial development to avoid additional testing, debug, and support costs, and to refrain from creating functionality that might consume system resources (e.g., CPU cycles and memory) without providing a sufficient benefit.

In one example, a single-socket application may be configured to monitor non-default port 10,000. Consequently, client systems attempting to connect to default secure sockets layer (SSL) port 443 will be unable to connect. Migrating the single-socket application to default SSL port 443 will cause clients configured to connect with non-default port 10,000 to encounter failed connections, although clients configured to connect with the default port will successfully connect.

Embodiments of the present invention enhance the functionality of a single-socket application configured to monitor for traffic at a single port (e.g., port 443). In particular, a tunneling protocol may be used to establish and configure a network tunnel to monitor for other traffic arriving at a second port (e.g., port 10,000). A network tunnel is a path through a network capable of receiving traffic at one network port and transporting (e.g., delivering) the traffic to a second network port. The network tunnel may further encapsulate the traffic, referred to as "payload" traffic, within a "carrier" protocol that masks the payload traffic from the network, leaving only the carrier protocol visible to the network. Encapsulation may provide enhanced security or may obfuscate the type of payload traffic being transferred via the network tunnel from detection by the network, or both. Network tunnels may deliver traffic from a first port in a computing device to a second port in the same computing device, or deliver traffic from a first port in a computing device to a second port located at a different (e.g., remote) computing device.

To ensure receipt of traffic arriving at both ports (443 and 10,000) without modifying the logic or functionality of the single-socket application, the network tunnel is used to communicate the traffic arriving at the second port (10,000) to the first port (443). In one embodiment, the network tunnel receives the traffic in the protocol specified by the client (e.g., SSL protocol) and encapsulates the other traffic in a second protocol (e.g., Secure Shell (SSH) protocol) allowing the traffic to traverse through the tunnel to the first port (443) where the traffic is un-encapsulated and delivered to the first port (443) in the first protocol as specified by the originating client (SSL). Once the traffic arrives at the first port in the specified protocol, the single-socket application monitoring the first port (443) receives this traffic and processes it accordingly.

Figure 1:
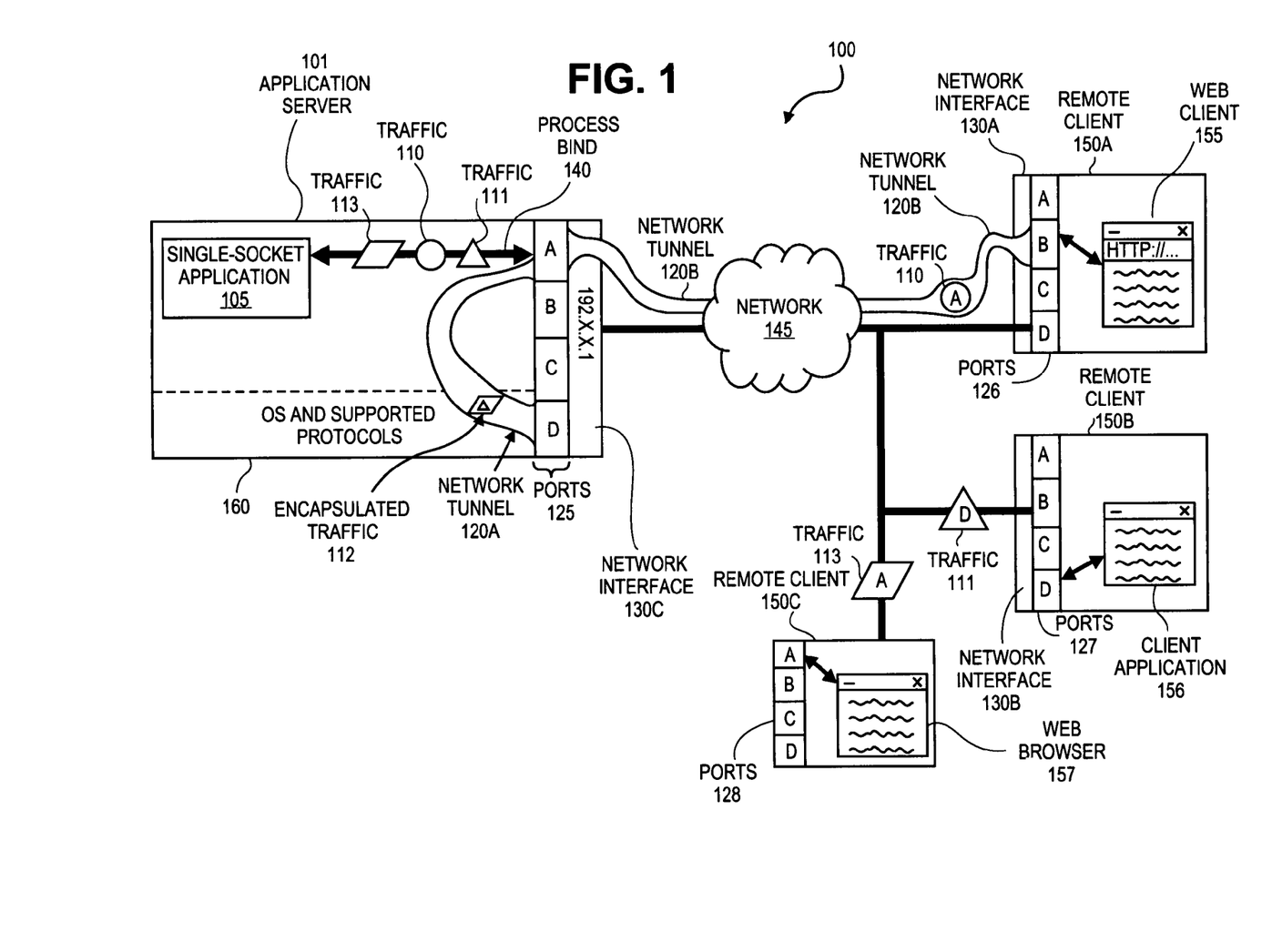
FIG. 1 illustrates an exemplary network architecture in which embodiments of the present invention may operate.

FIG. 1 illustrates an exemplary network architecture 100 in which embodiments of the present invention may operate. The architecture 100 may include an application server 101 coupled to clients 150A, 150B and 150C via a network 145 (e.g., a private network such as a LAN or a public network such as the Internet). The application server 101 may be, for example, a computer server (e.g., a web server), a desktop computer, a personal computer (PC) (e.g., an x86 based PC), etc. The clients 150 may be, for example, PCs, mobile phones, palm-sized computing devices, personal digital assistants (PDAs), etc. Client 150A may contain web client 155, client 150B may contain client application 156, and client 150C may contain web browser 157.

The application server 101 may contain an operating system (OS) and supported protocols 160, network interface 130C, and ports 125 connected with network interface 130C. In addition, application server 101 may host single-socket application 105. Application server 101 may support (e.g., execute, run, perform) the functions of single-socket application 105 through OS and supported protocols 160. In particular, OS and supported protocols 160 may provide some extraction for single-socket application 105 from hardware and firmware to enable the operational capabilities of application server 101.

OS and supported protocols 160 may operate a Linux based OS and support protocols including common network communication protocols such as Internet Protocol ("IP"), Transmission Control Protocol ("TCP"), User Datagram Protocol ("UDP"), Hypertext Transfer Protocol ("HTTP"), SSH, Transport Layer Security ("TLS"), SSL, and HTTP over SSL ("HTTPS"). Alternatively, OS and supported protocols 160 may operate a UNIX variant or a Microsoft™ Windows variant.

Application server 101 may employ network interface 130C for communicating on network 145. Network interface 130C is identifiable on the network by remote systems, such as remote clients 150A, 150B, and 150C, by an IP address (e.g., 192.x.x.1). Similarly, application server 101 can identify remote clients 150A, 50B, and 150C on the network 145 by network interfaces associated with each remote client, such as network interface 130A associated with remote client 150A, network interface 150B associated with remote client 150B, or a network interface associated with remote client 150C.

The combination of an IP address and a port number is known as a "socket." Sockets allow single-socket application 105 to "bind" its process to an IP address/port number pair and listen for traffic at that port. A process bind is a logical relationship (e.g., a reference or an association) between an application process within a computing device and a socket (e.g., an IP address/port number pair) on that computing device. The process bind may allow an application to receive information via the network port and instruct the computing device to store the information for later use, such as in a memory or a file system, or process the information in some way. The processes bind may further allow the application to send information retrieved from the computing device or from a connected network, to other remote systems addressable via a network port and IP address "bound" to the application.

As illustrated in FIG. 1, single-socket application 105 is connected with port 125A via process bind 140 to send and receive data over network 145 through the associated network interface, for example, network interface 130C. Alternatively, single-socket application 105 can bind to port 125B, 125C or 125D. Single-socket application 105 can bind to any available port on application server 101, typically port "0" through port "65,535." However, without multi-socket functionality within the single-socket application's logic base, single-socket application 105 cannot monitor multiple ports, or listen for and receive data from the multiple ports natively.

Ports 125(A-D) or "network ports" are identified by numbers, e.g. a "port number," in the header of a traffic packet, such as a TCP/IP data packet. The data or "traffic" may be routed to a specific port (e.g., default port 80 for HTTP traffic) at a particular machine (e.g., an Internet webserver). An application may have a default port provided by client software in addition to the destination IP address with the outgoing traffic.

Once data or traffic arrives at a correctly specified port, single-socket application 105 can receive that traffic and process it accordingly. However, single-socket application 105 must be configured to "see" the data arriving at any particular port. More specifically, single-socket application 105 is configured to "monitor" or "listen" to a particular port and when data or traffic arrives at that port, single-socket application 105 can process the data. In some embodiments, single-socket application 105 monitors port 125A and compiles a list of remote terminals 150A-C that send traffic to port 125A. In other embodiments, single-socket application 105 receives traffic 113 arriving at port 125A and writes records into a database operating on application server 101 based on the traffic contents. In yet other embodiments, single-socket application 105 receives traffic 111 via network tunnel 120A and returns an HTML compatible web page to remote client 150B that originated traffic 111.

In one embodiment, network tunnel 120A is used to enhance the capability of single-socket application 105 by allowing single-socket application 105 to receive traffic arriving at two network ports, 125A and 125D, within application server 101. For example, client application 156 at remote client 150B may direct traffic 111 to port 125D of application server 101 via network 145. Single-socket application 105 may be the intended destination, but cannot monitor for traffic 111 received at port 125D as process bind 140 connects it with port 125A only. In one embodiment, network tunnel 120A is configured at application server 101 to receive traffic 111 at port 125D and communicate traffic 111 to port 125A where it is received by single-socket application 105 via process bind 140. Network tunnel 120A may be initiated by a startup script or other logic associated with single-socket application 105 when single-socket application 105 is instantiated at application server 101.

In an alternative embodiment, network tunnel 120B is used to enhance the capability of single-socket application 105 by allowing single-socket application 105 to receive traffic generated by remote client 150A and destined for single-socket application 105, where remote client 150A is unaware of the port to which single-socket application 105 is bound. For example, web client 155 at remote client 150A may intend traffic 110 to be destined for single-socket application 105 but it may be unaware of port 125A to which single-socket application 105 is bound. To avoid arrival of traffic 110 at an incorrect port, web client 155 directs traffic 110 to port 126B of remote client 150A, where network tunnel 120B receives traffic 110 and communicates traffic 110 to port 125A of application server 101 via network 145. Single-socket application 105 then receives traffic 110 via process bind 140. Network tunnel 120B may be initiated by a startup script or logic associated with web client 155 when web client 155 is instantiated at remote client 150A.

Network tunnel 120A and/or 120B may receive traffic (e.g., 110, 111, and 113 referred to as "payload" traffic) in a first protocol and encapsulate the traffic in a second protocol (e.g., a "carrier protocol") resulting in encapsulated traffic 112. Encapsulated traffic 112 may pass through or "traverse" network tunnels 120A or 120B, or in some embodiments, both network tunnels 120A and 120B, and may be delivered to port 125A. As part of the delivery to port 125A, the network tunnel removes (e.g., un-encapsulates) the payload traffic (e.g., traffic 110, 111, or 113) from the carrier protocol, (e.g., encapsulated traffic 112). Single-socket application 105, remote clients 150A-C, and their respective client applications 155-157 need not be involved in the tunneling process or require knowledge of the existence or configuration of network tunnels 120A or 120B.

In one embodiment, network tunnels 120A and/or 120B "mask" or obfuscate encapsulated traffic 112 as ordinary payload traffic when it traverses the network tunnel (120A or 120B). Encapsulated traffic 112 when viewed by OS and supported protocols 160 may appear as payload traffic, despite being a carrier protocol encapsulating payload traffic.

Figure 2A:
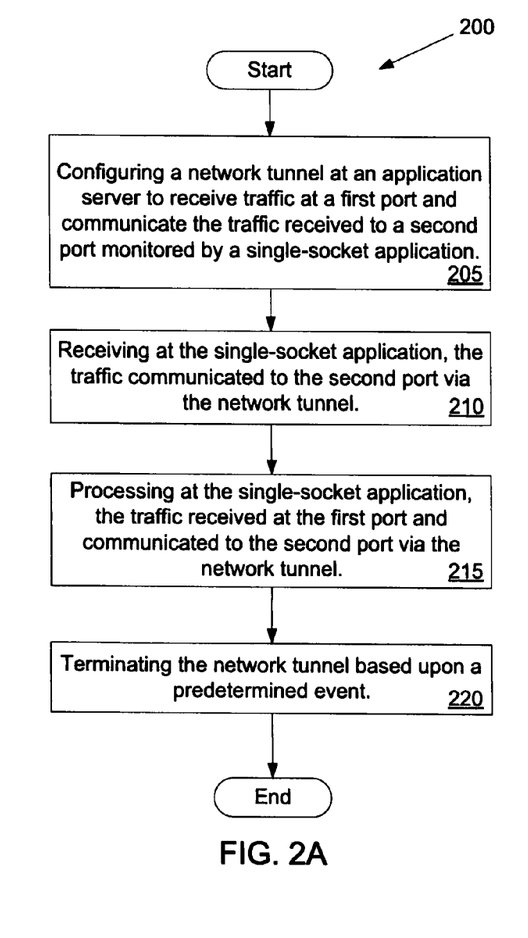
FIG. 2A is a flow diagram illustrating a method for enabling a single-socket application to receive information via multiple network ports, in accordance with one embodiment of the present invention.
Figure 2B:
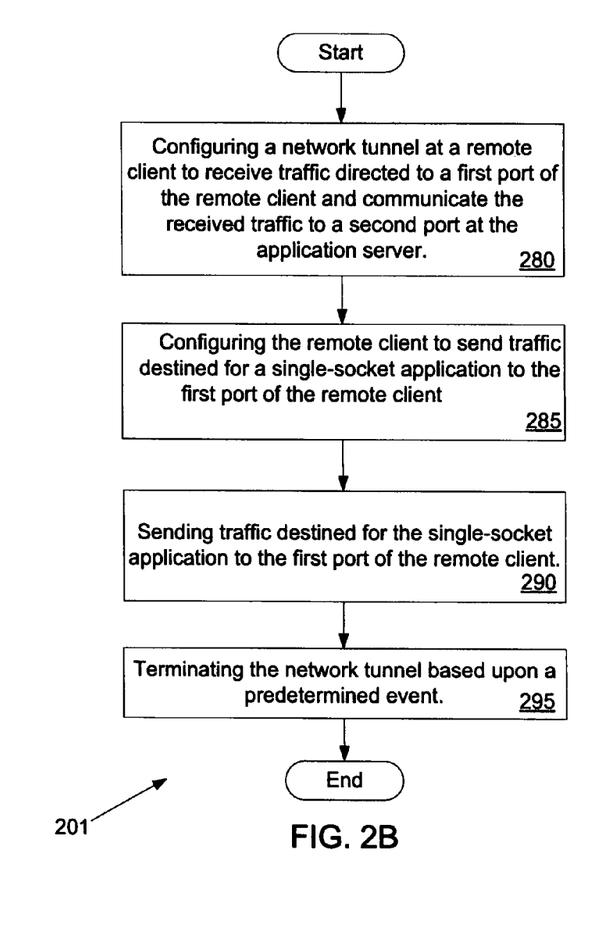
FIG. 2B is a flow diagram illustrating a method for enabling a remote client to send information to a single-socket application via a network tunnel configured at the remote client, in accordance with one embodiment of the present invention.

FIG. 2A is a flow diagram illustrating method 200 for enabling a single-socket application to receive information via multiple network ports, in accordance with one embodiment of the present invention. FIG. 2B is a flow diagram illustrating a method 201 for enabling a remote client to send information to a single-socket application via a network tunnel configured at the remote client, in accordance with one embodiment of the present invention. Methods 200 and 201 may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 200 is performed by an application server, such as application server 101 of FIG. 1, and method 201 is performed by a remote client, such as remote client 150A of FIG. 1.

Referring to FIG. 2A, method 200 begins with processing logic configuring a network tunnel at an application server to receive traffic at a first port and communicate the traffic received to a second port monitored by a single-socket application. (block 205).

In some embodiments, traffic received by the network tunnel at the first port is encapsulated in a network protocol, different than a network protocol originally specified for the traffic. For example, traffic may be received by the network tunnel in an SSL compatible protocol. The network tunnel may encapsulate the SSL compatible traffic within a carrier protocol, for example, an SSH compatible protocol. The network tunnel may transport or communicate the SSL payload traffic to the second port monitored by the single-socket application within the SSH protocol, and deliver the SSL payload traffic to the second port in the SSL compatible protocol after un-encapsulating the SSL payload traffic from the SSH carrier protocol. In other embodiments, traffic may arrive in an HTTP or HTTPS protocol and be encapsulated in an SSH carrier protocol for transport via the network tunnel.

In some embodiments, a second network tunnel is configured to communicate traffic received at a third port of the application server to the port monitored by the single-socket application. Any number of network tunnels may be established to communicate traffic from an initially specified port to a different port monitored by the single-socket application, enabling the single-socket application to receive data, input, instructions, commands, or other information via multiple network ports.

In one embodiment, the network tunnel is configured based on user input (e.g., via a Linux command line using SSH). In an alternative embodiment, a network tunnel is configured automatically via a start-up script after confirming the successful instantiation of the single-socket application on an application server.

At block 210, processing logic receives, at the single-socket application, the traffic communicated to the second port via the network tunnel. At block 215, processing logic processes traffic at the single-socket application. In particular, the single-socket application processes traffic received at the first port and communicated to the second port via the network tunnel.

In some embodiments, data or traffic arriving at the port via a network tunnel is processed by the single-socket application in the same manner as traffic originally directed to the monitored port without traversing a network tunnel. The single-socket application may process all traffic received without regard to a port number originally specified by an originating application or client. In some embodiments, a single-socket application may respond to an originating remote client via the monitored port. In other embodiments, a network tunnel may intercept single-socket application responses and deliver the responses to an originating remote client via the network tunnel.

At block 220, processing logic terminates the network tunnel upon a predetermined event. In some embodiments, the network tunnel is configured to terminate after all connections to it cease or after a pre-determined period of time, for example, 12 hours or 24 hours. In other embodiments, the network tunnel is terminated via a shutdown script or a "kill script" after the termination of the single-socket application. In a particular embodiment, a "kill-9" UNIX or Linux command is used to terminate the network tunnel on Linux or UNIX based systems. For example, the "ps" UNIX command may be piped to the "grep" or "awk" commands and filtered by, for example, the string "10000:localhost:443," then parsed for the process ID field of the "ps" UNIX command's output for use in the "kill-9" command.

Referring to FIG. 2B, method 201 begins with processing logic configuring a network tunnel at a remote client to receive traffic directed to a first port of the remote client and communicating the received traffic to a second port at the application server (block 280). In one embodiment, the command "ssh-f-L 10000:localhost:443 root@${SINGLESOCKETAPPLICATION}-g sleep 86400" is used to configure the network tunnel via either a command line or a start-up script. The above command requires shell substitution to resolve the variable "${SINGLESOCKETAPPLICATION}" as well as a populated environmental variable. Use of the above ssh command further requires a valid SSH keypair stored within the system. The variable "${SINGLESOCKETAPPLICATION}" resolves to an IP address or hostname of the application server executing the single-socket application. Within the command, "ssh" is the name of a Secure Shell program capable of creating network tunnels. The flag "-f" requests the ssh program to go to the background before launching the appended command, "sleep 86400." The "sleep 86400" command tells the operating system to keep a process alive for a predetermined period of time, before terminating, here the predetermined period of time is 86,400 seconds or more simply, 24 hours. The flag "-L" indicates that a port on the local side (e.g., 10,000 at the remote client) is to be tunneled to a port on the remote side (e.g., 443 at the application server). The "-g" flag allows remote hosts to connect with locally forwarded ports, and may be used when traffic is being tunneled to a remote host location (e.g., application server 101) and a response is expected or desired in return from the remote host.

At block 285, processing logic configures the remote client to send traffic destined for a singly-socket application to the first port of the remote client. The remote client may be configured in response to user input or automatically (e.g., when configuring the network tunnel at the remote client).

At block 290, processing logic sends traffic destined for the single-socket application to the first port of the remote client, where it is received by the network tunnel and sent to the predefined port at the application server. In some embodiments, the traffic sent to the first port of the remote client is communicated to the second port at the application server via a network communicably connecting the remote client and the application server. A client application executing on the remote client may initiate sending the data to the first port of the remote client without knowledge of the port number monitored by the single-socket application at the application server.

At block 295, processing logic terminates the network tunnel based upon a predetermined event. In some embodiments, a client application executing at the remote client triggers the termination of the network tunnel, for example, based on a termination event associated with a client application executing on the remote client.

In one embodiment, methods 200 and 201 are performed in combination to allow the single-socket application to receive traffic sent by remote clients to multiple ports at the application server, as well as traffic sent by remote clients to their internal ports.

Figure 3:
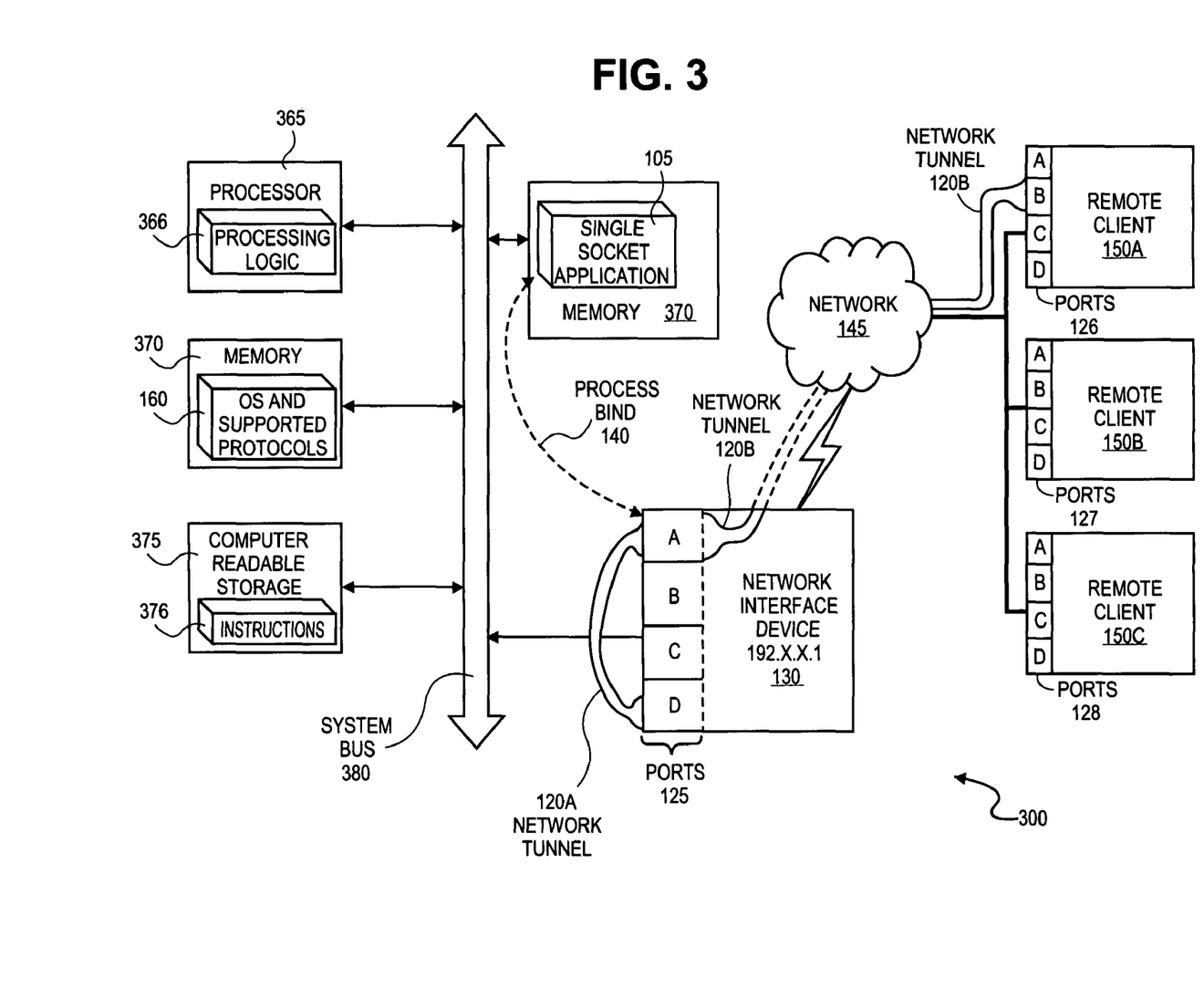
FIG. 3 illustrates a diagrammatic representation of a single-socket application enabled to receive information via multiple network ports, in accordance with one embodiment of the present invention.

FIG. 3 illustrates one embodiment of an application server system 300 for enhancing functionality of a local single-socket application. The system 300 includes network interface 130 to receive traffic from remote clients (e.g., clients 150A-C), where traffic from remote client 150A and 150C is received at port 125A and processed by single-socket application 105 operating on system 300, and traffic from remote client 150B is received at port 125D, tunneled to port 125A, and processed by single-socket application 105.

System 300 includes processor 365, memory 370, computer readable storage 375, and network interface device 130, each of which is in communication with one another via system bus 380. Processor 365 includes processing logic 366. Memory 370 includes OS and supported protocols 160, and further includes single-socket application 105 which operates on system 300. In one embodiment illustrated in FIG. 3, memory 370 may be two components. In another embodiment, memory 370 is a single memory component. Computer readable storage 375 includes instructions 376. Network interface device 130 is connected with ports 125A-D. System 300 is communicably attached to remote clients 150A-C via network 145. Network tunnel 120A communicates traffic received at port 125D of system 300's network interface device 130 to port 125A of network interface device 130. Network tunnel 120B communicates traffic between port 126B of remote client 150A and port 125A of system 300 via network 145.

Instructions 376 (e.g., processing logic) enable system 300 to carry out various operations, such as configuring single-socket application 105 to receive traffic at port 125A. Single-socket application 105 has native capabilities to listen to only one network port at a time, but may be configured or re-configured to listen to a different port. Through the use of network tunnels 120A-B, single-socket application 105 may receive traffic and information originally directed at ports that are not monitored by single-socket application 105.

Figure 4:
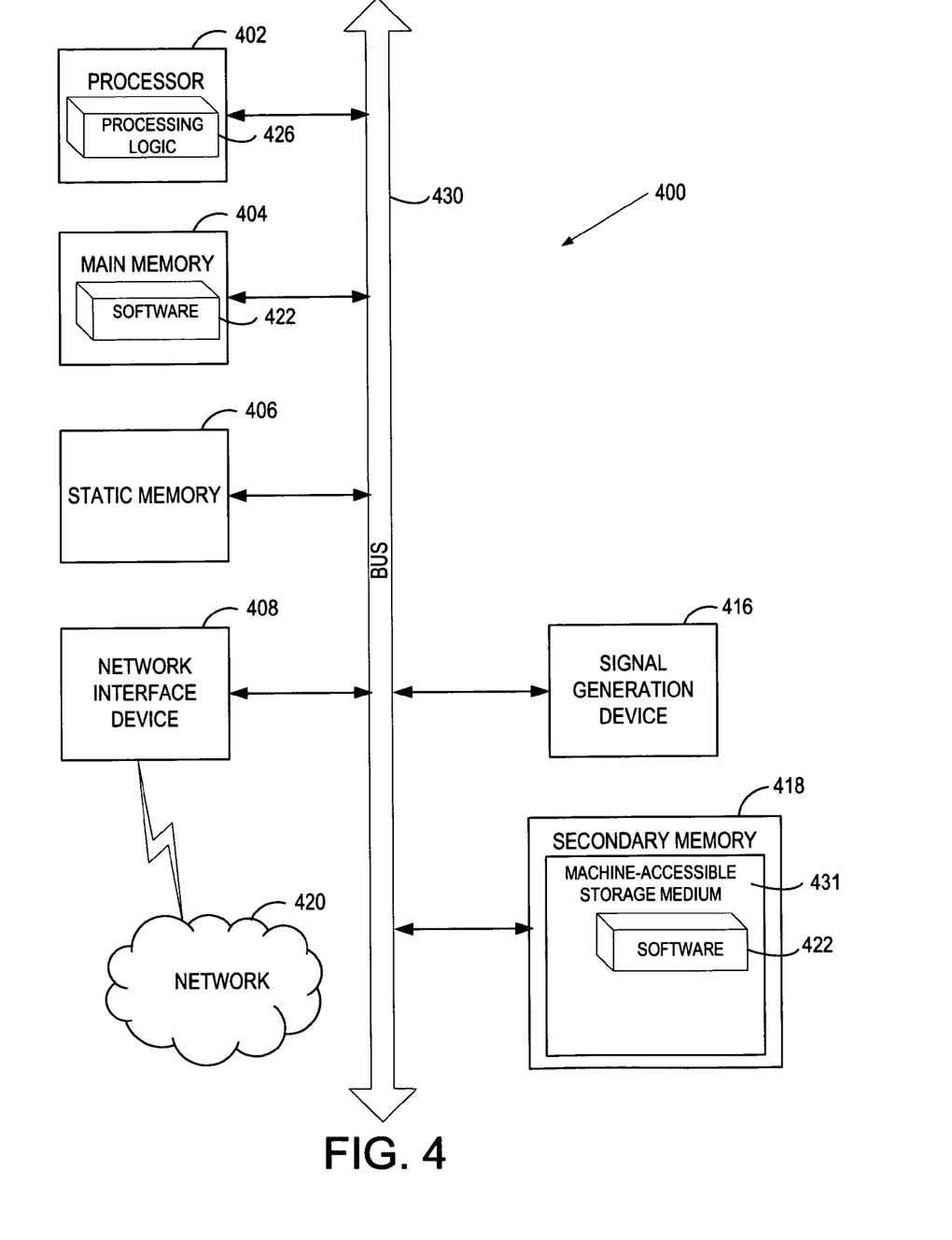
FIG. 4 illustrates a diagrammatic representation of a machine in the exemplary form of a computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 408.

While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A computer-implemented method in an application server comprising:

configuring a network tunnel at the application server to receive traffic intended for a single-socket application at a first port of the application server and communicate the received traffic to a second port of the application server, wherein the second port is monitored for incoming traffic by the single-socket application hosted by the application server; and processing at the single-socket application, the traffic received at the first port and communicated to the second port via the network tunnel, the single-socket application being configured to receive traffic at the second port but not the first port;

wherein the single-socket application lacks functionality to monitor multiple network ports simultaneously.

2. The method of claim 1, wherein configuring the network tunnel to communicate the traffic received at the first port to the second port comprises:

receiving the traffic in a first network protocol;

encapsulating the traffic in a second network protocol, different from the first network protocol;

transporting the encapsulated traffic from the first port to the second port via the second network protocol; and delivering the traffic to the second port via the first network protocol, un-encapsulated from the second network protocol.

3. The method of claim 2, wherein the first network protocol comprises a Secure Socket Layer ("SSL") network protocol or a Transport Layer Security ("TLS") network protocol, and wherein the second network protocol comprises a network tunneling protocol.

4. The method of claim 3, wherein the second network protocol comprises a Secure Shell ("SSH") network protocol.

5. The method of claim 1, wherein the network tunnel to receive the traffic at the first port comprises the network tunnel to receive the traffic from a remote client.

6. The method of claim 5, further comprising:

receiving other traffic at the second port of the application server from a second remote client, wherein the other traffic directed by the second remote client to the second port monitored by the single-socket application, bypassing the network tunnel.

7. The method of claim 1, further comprising:

terminating the network tunnel when the single-socket application terminates.

8. The method of claim 1, further comprising:

configuring a second network tunnel to communicate network data packets received at a third port to the second port monitored by the single-socket application.

9. An application server apparatus comprising:

a memory; and a processor, coupled to the memory, to cause:

a network tunnel to receive traffic intended for a single-socket application at a first port of an application server and to communicate the received traffic to a second port of the application server; and the single-socket application, coupled to the second port of the application server, to monitor for incoming traffic at the second port, and to receive the traffic destined for the first port and communicated to the second port via the network tunnel, the single-socket application being configured to receive traffic at the second port but not the first port;

wherein the single-socket application lacks functionality to monitor multiple network ports simultaneously.

10. The apparatus of claim 9, wherein the network tunnel is to receive the traffic in a first network protocol, to encapsulate the traffic in a second network protocol, different from the first network protocol, to transport the encapsulated traffic from the first port to the second port via the second network protocol, and to deliver the traffic to the second port via the first network protocol, un-encapsulated from the second network protocol.

11. The apparatus of claim 10, wherein the first network protocol comprises a Secure Socket Layer ("SSL") network protocol or a Transport Layer Security ("TLS") network protocol, and wherein the second network protocol comprises a Secure Shell ("SSH") network protocol.

12. The apparatus of claim 9, wherein the first port is at a remote client.

13. The apparatus of claim 9, wherein the network tunnel is to terminate when the single-socket application terminates.

14. A non-transitory computer readable storage medium including instructions that, when executed by a processing system, cause the processing system to perform a method comprising:

configuring a network tunnel at the application server to receive traffic intended for a single-socket application at a first port of the application server and communicate the received traffic to a second port of the application server, wherein the second port is monitored for incoming traffic by the single-socket application; and processing at the single-socket application, the traffic received at the first port and communicated to the second port via the network tunnel, the single-socket application being configured to receive traffic at the second port but not the first port;

wherein the single-socket application lacks functionality to monitor multiple network ports simultaneously.

15. The computer readable storage medium of claim 14, wherein configuring the network tunnel to communicate the traffic received at the first port to the second port comprises:

receiving the traffic in a first network protocol;

encapsulating the traffic in a second network protocol, different from the first network protocol;

transporting the encapsulated traffic from the first port to the second port via the second network protocol; and delivering the traffic to the second port via the first network protocol, un-encapsulated from the second network protocol.

16. The computer readable storage medium of claim 15, wherein the first network protocol comprises a Secure Socket Layer ("SSL") network protocol or a Transport Layer Security ("TLS") network protocol, and wherein the second network protocol comprises a Secure Shell ("SSH") network protocol.

17. The computer readable storage medium of claim 15, wherein the first port is at a remote client.

18. The computer readable storage medium of claim 17, wherein the method further comprises:

receiving other traffic at the second port of the application server from a second remote client, wherein the other traffic directed by the second remote client to the second port monitored by the single-socket application, bypassing the network tunnel.

19. The computer readable storage medium of claim 15, wherein the method further comprises:

terminating the network tunnel when the single-socket application terminates.

* * * * *